United States Patent
Du et al.

(10) Patent No.: US 9,860,070 B2
(45) Date of Patent: Jan. 2, 2018

(54) ENTITY IDENTIFICATION METHOD, APPARATUS AND SYSTEM

(71) Applicant: CHINA IWNCOMM CO., LTD., Shaanxi (CN)

(72) Inventors: Zhiqiang Du, Shaanxi (CN); Yanan Hu, Shaanxi (CN); Qin Li, Shaanxi (CN); Ming Li, Shaanxi (CN); Yi Li, Shaanxi (CN)

(73) Assignee: CHINA IWNCOMM CO., LTD, Shaanxi (CN)

( * ) Notice: Subject to any disclaimer, the term of this patent is extended or adjusted under 35 U.S.C. 154(b) by 14 days.

(21) Appl. No.: 15/109,680

(22) PCT Filed: Jan. 27, 2015

(86) PCT No.: PCT/CN2015/071629
§ 371 (c)(1),
(2) Date: Jul. 5, 2016

(87) PCT Pub. No.: WO2015/113485
PCT Pub. Date: Aug. 6, 2015

(65) Prior Publication Data
US 2016/0337135 A1    Nov. 17, 2016

(30) Foreign Application Priority Data
Jan. 28, 2014    (CN) .......................... 2014 1 0041837

(51) Int. Cl.
*H04L 29/06*    (2006.01)
*H04L 9/32*    (2006.01)

(52) U.S. Cl.
CPC .................................. *H04L 9/3273* (2013.01)

(58) Field of Classification Search
None
See application file for complete search history.

(56) References Cited

U.S. PATENT DOCUMENTS

| 2007/0055871 A1* | 3/2007 | Ghanea-Hercock .... G06F 21/31 713/168 |
| 2008/0071900 A1* | 3/2008 | Hecker ............... H04L 41/0893 709/223 |

(Continued)

FOREIGN PATENT DOCUMENTS

| CN | 102497273 A | 6/2012 |
| CN | 102739660 A | 10/2012 |

(Continued)

OTHER PUBLICATIONS

International Search Report for PCT/CN2015/071629 dated May 6, 2015.

(Continued)

*Primary Examiner* — Amir Mehrmanesh
(74) *Attorney, Agent, or Firm* — Arent Fox LLP; Michael Fainberg

(57) ABSTRACT

The present invention provides an entity identification method, apparatus and system, and relates to: an entity A transmits an identification request message to an entity B, the identification request message includes the result SN1 of an XOR operation of a Pre-Shared Key (PSK) and the data from processing data N1 according to a first agreed rule, wherein data N1 is generated by entity A, and the PSK is a key shared by A and B; entity B receives the identification request message, performs an XOR operation on SN1 and PSK, performs a process according to a second agreed rule, then performs a process according to a third agreed rule, and then performs an XOR operation again with the PSK processed according to the third agreed rule and then processed according to a fourth rule to obtain SON1, and transmits SON1 through an identification response message to entity A.

15 Claims, 4 Drawing Sheets

(56) References Cited

U.S. PATENT DOCUMENTS

| | | | |
|---|---|---|---|
| 2013/0104246 A1* | 4/2013 | Bear | H04L 63/10 726/28 |
| 2014/0229792 A1* | 8/2014 | Varnica | H03M 13/1108 714/759 |
| 2015/0124732 A1* | 5/2015 | Seo | H04B 7/0413 370/329 |

FOREIGN PATENT DOCUMENTS

| | | |
|---|---|---|
| EP | 2611066 A1 | 7/2013 |
| WO | 2011097772 A1 | 8/2011 |

OTHER PUBLICATIONS

Vajada et al., Lightweight Authentication Protocols for Low-Cost RFID Tags, Aug. 5, 2003, Retrieved from the Internet, http://www.crysys.hu/.

Yoon et al. HB-MP++ Protocol: An Ultra Light-weight Authentication Protocol for RFID System, 2009 IEEE International Conference on RFID, Apr. 27, 20019, pp. 186-191.

* cited by examiner

ENTITY IDENTIFICATION METHOD, APPARATUS AND SYSTEM

CROSS-REFERENCE TO RELATED APPLICATIONS

This application is a US National Stage of International Application No. PCT/CN2015/071629, filed on Jan. 27, 2015, designating the United States and claiming the priority to Chinese Patent Application No. 201410041837.0, filed with the Chinese Patent Office on Jan. 28, 2014 and entitled "Method, apparatus, and system for authenticating an entity", the content of which is hereby incorporated by reference in its entirety.

FIELD

The present application relates to the field of network security applications among information security technologies, and particularly to a method, apparatus, and system for authenticating an entity.

BACKGROUND

Resource-limited wireless network devices, including nodes in sensor networks, electronic tags in an RFID system, etc., have an extensive application prospective in the fields of environment monitoring, logistics, etc., and are playing a more and more important role in these fields. Since these network entities may be susceptible to attacks, including their messages being eavesdropped, tampered and falsified, the entities being captured and duplicated, etc., due to their wireless and broadcast characteristics in communication, it may be necessary to introduce authentication and message security mechanisms with a low overhead so as to guarantee the legality of these network entities, and the secrecy and integrity of their communication messages.

However the existing authentication methods are generally based upon cipher operations, and these authentication methods based upon cipher operations require the network entities to be preset with a corresponding cipher algorithm, otherwise they can not enforce any authentication protocol; and even if the network entities are preset with the cipher algorithm, then this authentication protocol being enforced may bring a calculation overhead to the network entities, for example, all the authentication methods based upon symmetric and asymmetric cipher algorithms require the network entities to perform encryption and decryption operations, which may add a resource burden to the network entities.

SUMMARY

The application provides a method, apparatus, and system for authenticating an entity so as to save a calculation overhead in an entity authentication process.

The application provides a method for authenticating an entity, the method including:

an operation 1, sending, by an entity A, an authentication request message to an entity B, wherein the authentication request message includes a result SN1 of an XOR operation on a result of processing under a first predefined rule on data N1 generated locally by the entity A, and a PSK which is a key shared by the entity A and the entity B;

an operation 2, receiving, by the entity B, the authentication request message sent by the entity A, performing an XOR operation on the SN1 in the authentication request message, and the PSK, then processing them under a second predefined rule, further processing them under a third predefined rule, then performing a further XOR operation on a result of the processing under the third predefined rule, and the PSK processed under the third predefined rule and further processed under a fourth predefined rule to obtain SON1, and sending the SON1 to the entity A in an authentication response message, wherein the second predefined rule is a reversed rule of the first predefined rule; and an operation 3, receiving, by the entity A, the authentication response message sent by the entity B, performing an XOR operation on the SON1 in the authentication response message, and the PSK processed under the third predefined rule and further processed under the fourth predefined rule, comparing a result of the XOR operation with the N1 processed under the third predefined rule, and determining from a result of the comparison whether the entity B is legal.

The application provides an apparatus for authenticating an entity, the apparatus including:

a request message sending unit configured to send an authentication request message to an entity B, wherein the authentication request message includes a result SN1 of an XOR operation on a result of processing under a first predefined rule on data N1 generated locally by the apparatus for authenticating an entity, and a PSK which is a key shared by the apparatus for authenticating an entity and the entity B; and an authenticating unit configured to receive an authentication response message sent by the entity B, to perform an XOR operation on SON1 in the authentication response message, and the PSK processed under a third predefined rule and further processed under a fourth predefined rule, to compare a result of the XOR operation with the N1 processed under the third predefined rule, and to determine from a result of the comparison whether the entity B is legal, wherein the SON1 represents a result of performing by the entity B an XOR operation on the SN1 in the received authentication request message and the PSK, then processing them under the second predefined rule, further processing them under the third predefined rule, and then performing a further XOR operation on a result of the processing under the third predefined rule, and the PSK processed under the third predefined rule and further processed under the fourth predefined rule, wherein the second predefined rule is a reversed rule of the first predefined rule.

The application further provides another apparatus for authenticating an entity, the apparatus including:

a request message receiving unit configured to receive an authentication request message sent by an entity A, wherein the authentication request message includes a result SN1 of an XOR operation on a result of processing under a first predefined rule on data N1 generated locally by the entity A, and a PSK which is a key shared by the entity A and the apparatus for authenticating an entity; and a response message sending unit configured to perform an XOR operation on the SN1 in the authentication request message, and the PSK, then process them under a second predefined rule, further process them under a third predefined rule, then perform a further XOR operation on a result of the processing under the third predefined rule, and the PSK processed under the third predefined rule and further processed under a fourth predefined rule to obtain SON1, and to send the SON1 to the entity A in an authentication response message, wherein the second predefined rule is a reversed rule of the first predefined rule.

The application further provides a system for authenticating an entity, the system including an entity A and an entity B, wherein:

the entity A is configured to send an authentication request message to the entity B, wherein the authentication request message includes a result SN1 of an XOR operation on a result of processing under a first predefined rule on data N1 generated locally by the entity A, and a PSK which is a key shared by the entity A and the entity B;

the entity B is configured to receive the authentication request message sent by the entity A, to perform an XOR operation on the SN1 in the authentication request message, and the PSK, then process them under a second predefined rule, further process them under a third predefined rule, then perform a further XOR operation on a result of the processing under the third predefined rule, and the PSK processed under the third predefined rule and further processed under a fourth predefined rule to obtain SON1, and to send the SON1 to the entity A in an authentication response message, wherein the second predefined rule is a reversed rule of the first predefined rule; and the entity A is configured to receive the authentication response message sent by the entity B, to perform an XOR operation on the SON1 in the authentication response message, and the PSK processed under the third predefined rule and further processed under the fourth predefined rule, to compare a result of the XOR operation with the N1 processed under the third predefined rule, and to determine from a result of the comparison whether the entity B is legal.

With the method, apparatus, and system for authenticating an entity according to the application, there are the following advantageous effects: lightweight entity authentication can be performed based upon the XOR operation which is far more efficient than those authentication methods based upon symmetric and asymmetric encryption and decryption operations, so that the application can save effectively a calculation overhead in an entity authentication process, and improve the security of the authentication process. Moreover the security of the entity authentication process can be improved by applying the respective predefined rules.

DETAILED DESCRIPTION OF THE EMBODIMENTS

The method, apparatus, and system for authenticating an entity according to the application will be described below in further details with reference to the drawings and the embodiments thereof.

Figure 1:
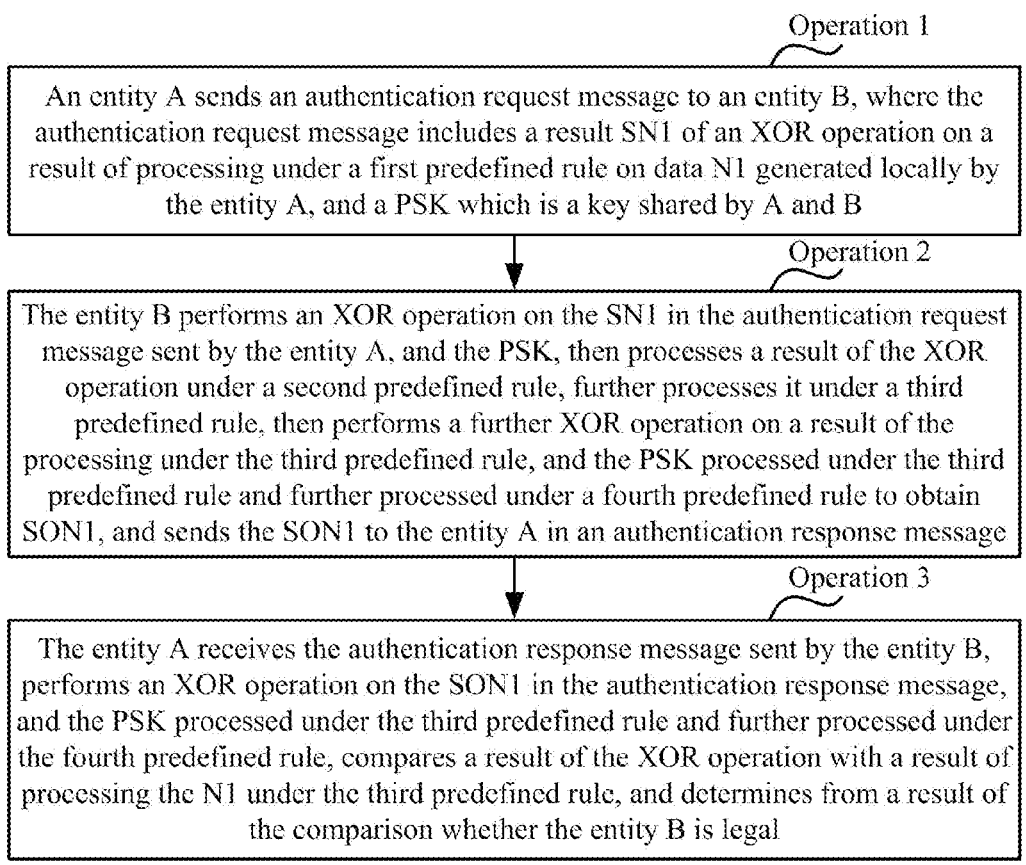
FIG. 1 is a flow chart of a method for authenticating an entity according to an embodiment of the application.
Figure 2:
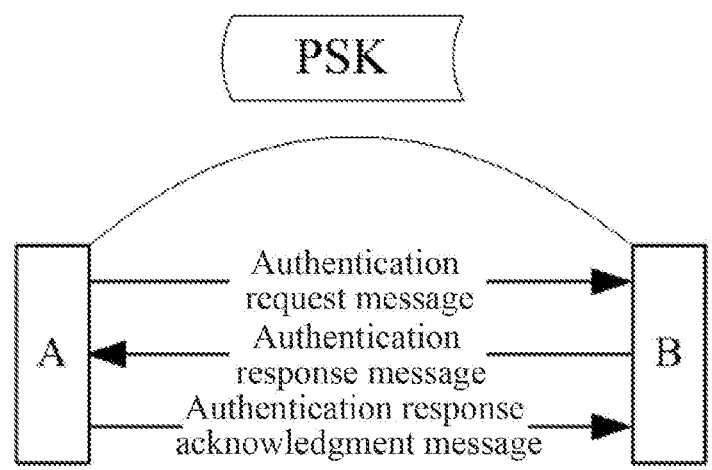
FIG. 2 is a schematic diagram of the method for authenticating the entity according to an embodiment of the application.

In order to address the technical problem above in the prior art, the application provides a lightweight method, apparatus, and system for authenticating an entity, and as illustrated in FIG. 1 and FIG. 2, the method for authenticating an entity according to an embodiment of the application includes the following operations:

In the operation 1, An entity A sends an authentication request message to an entity B, where the authentication request message includes a result SN1 of an XOR operation on a result of processing under a first predefined rule on data N1 generated locally by the entity A, and a PSK which is a key shared by the entity A and the entity B, where the entity authentication solution will become more secured using the N1 processed under the first predefined rule as compared with using the N1 directly without processing it.

In the embodiment of the application, the key has been shared between the entity A and the entity B before being authenticated, and will be referred in this embodiment to as a Pre-Shared Key (PSK).

Thus the entity A can perform the XOR operation directly using the locally generated data, e.g., $SN1=(N1+O_n) \oplus PSK$, where the symbol "$\oplus$" represents a bit-wise XOR operation, and $O_n$ represents a constant (e.g., $5555\ 5555\ 5555\ 5555_h$); and the same will apply hereinafter. The XOR operation as referred to in the embodiment of the application generally refers to a bit-wise XOR operation, where "$+O_n$" represents the first predefined rule. Moreover the first predefined rule can alternatively be head and tail inversion, forward cyclic shifting, addition of predetermined bits at preset positions, addition to a predefined constant, etc., but as compared with these rules, "$+O_n$" can prevent more effectively a potential security vulnerability from occurring to thereby improve the security of the entity authentication solution according to the application.

Preferably the data N1 generated locally by the entity A is a random number generated by the entity A; and of course, the data can alternatively be data otherwise generated locally by the entity A.

In the operation 2, upon reception of the authentication request message sent by the entity A, the entity B performs an XOR operation on the SN1 in the authentication request message, and the PSK, then processes them under a second predefined rule, further processes them under a third predefined rule, then performs a further XOR operation on a result of the processing under the third predefined rule, and the PSK processed under the third predefined rule and further processed under a fourth predefined rule to obtain SON1, and sends the SON1 to the entity A in an authentication response message, where the first predefined rule shall be applied in correspondence to the second predefined rule, that is, the second predefined rule is a reversed rule of the first predefined rule; the entity authentication solution according to the application will become more secured using the result of the XOR operation processed under the second predefined rule and the third predefined rule as compared with using directly the result of the XOR operation without processing it; and the entity authentication solution according to the application will become more secure using the PSK processed under the third and fourth predefined rules as compared with using directly the PSK without processing it.

In this embodiment, upon reception of the authentication request message sent by the entity A, the entity B obtains the SN1 in the authentication request message, performs the XOR operation on the SN1 and the PSK, and then processes them under the second predefined rule to obtain $N1_B$. If the first predefined rule applied by the entity A is "$+O_n$", then the $N1_B$ will be calculated in the equation of $N1_B = SN1 \oplus PSK - O_n$. Then $SON1 = (PSK'+O_n) \oplus N1_B'$ is calculated.

Here $N1_B'$ represents the $N1_B$ processed under the third predefined rule, and PSK' represents the PSK processed under the third predefined rule.

Here "$-O_n$" represents a preferred implementation of the second predefined rule; and moreover as long as the second predefined rule is a reversed rule of the first predefined rule, the second predefined rule can alternatively be head and tail inversion (correspondingly the first predefined rule is head and tail inversion), backward cyclic shifting (correspondingly the first predefined rule is forward cyclic shifting), removal of predetermined bits at preset positions (correspondingly the first predefined rule is addition of the predetermined bits at the preset positions), subtraction of a predefined constant (correspondingly the first predefined rule is addition to the predefined constant), etc., but as compared with these rules, "$-O_n$" can prevent more effectively a potential security vulnerability from occurring to thereby improve the security of the entity authentication solution according to the application. Here a preferred implementation of the third predefined rule is bit-wise leftward cyclic shifting by n bits (the value of n is the number of bits which are "1" in the $N1_B$, and in another implementation, n can alternatively represent the number of bits which are "0" in the $N1_B$). Moreover the third predefined rule can alternatively be rightward cyclic shifting, head and tail inversion, etc. "$+O_n$" represents a preferred implementation of the fourth predefined rule. Moreover the fourth predefined rule can alternatively be head and tail inversion, cyclic shifting, addition of predetermined bits at preset positions, addition to a predefined constant, etc., but as compared with these rules, "$+O_n$" can prevent more effectively a potential security vulnerability from occurring to thereby improve the security of the entity authentication solution according to the application. In general, as compared with the other implementations, the respective preferred embodiments in this paragraph can prevent more effectively a potential security vulnerability from occurring to thereby improve the security of the entity authentication solution according to the application.

In the operation 3, the entity A receives the authentication response message sent by the entity B, performs an XOR operation on the SON1 in the authentication response message, and the PSK processed under the fourth predefined rule and further processed under the third predefined rule, compares a result of the XOR operation with the N1 processed under the third predefined rule, and determines from a result of the comparison whether the entity B is legal, and if the result of the comparison shows consistency, then a result of the authentication is that the entity B is legal; otherwise, the result of the authentication is that the entity B is illegal.

The method for authenticating an entity according to the embodiment of the application is based upon the XOR operation which is far more efficient than the symmetric and asymmetric encryption and decryption operations, so that the entity A can authenticate the entity B at a low overhead, which can be applicable to a resource-limited network. The application can improve the security of the entity authentication process while saving effectively the calculation overhead in the entity authentication process.

Preferably in the operation 1, if the entity A has not received the authentication response message sent by the entity B in a preset period T1 of time after the authentication request message is sent, then entity A may resend the authentication request message to the entity B.

If the entity A has not received the authentication response message sent by the entity B after the authentication request message is resent for a preset number g of times, then the entity A may determine that the authentication has failed; and If the entity A receives the authentication response message returned by the entity B, then the entity A can obtain the result of the authentication instead of determining that the authentication has failed.

Preferably in the operation 3, the method further includes:

The entity A sends the result of the authentication on the entity B to the entity B in a first authentication result message; and if the entity A determines that the entity B is legal, then the authentication result message may include authentication success information; otherwise, the authentication result message may include authentication failure information.

Then in the operation 2, if the entity B has not received the first authentication result message sent by the entity A in a preset period T3 of time after the authentication response message is sent, then the entity B may resend the authentication response message to the entity A; and If the entity B has not received the first authentication result message sent by the entity A after the authentication response message is resent for a preset number q of times, then the entity B may determine that the authentication has failed; and if the entity B receives the first authentication result message sent by the entity A, then the entity B can obtain the result of the authentication instead of determining that the authentication has failed.

Figure 3:
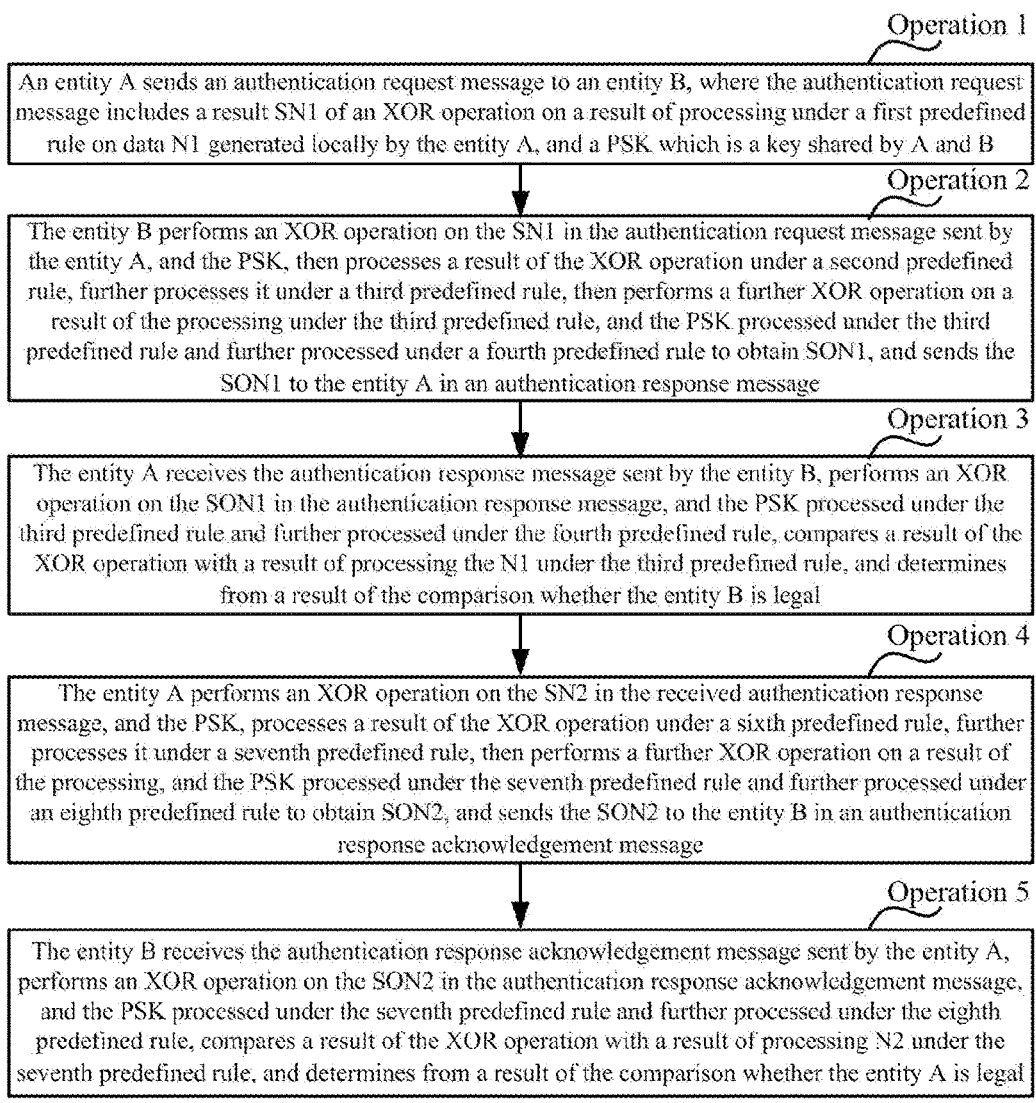
FIG. 3 is a flow chart of a method for authenticating an entity according to another embodiment of the application.

For authentication between entities in a resource-limited network, only unidirectional authentication is required in some scenarios, whereas bidirectional authentication is required in some scenarios; and preferably further to unidirectional authentication above, if bidirectional authentication with a low overhead between the entity A and the entity B is required, then in the operation 2, upon reception of the authentication request message sent by the entity A, the entity B may perform a further XOR operation on a result of processing under a fifth predefined rule on data N2 generated locally by the entity B, and the PSK to obtain SN2, then the authentication response message sent by the entity B to the entity A may further includes the SN2. Preferably the data N2 generated locally by the entity B is a random number generated by the entity B; and of course, the entity B can alternatively generate otherwise the local data, where the fifth predefined rule shall be applied in correspondence to a sixth predefined rule, that is, the fifth predefined rule is a reversed rule of the sixth predefined rule; and the entity authentication solution will become more secured using the N2 processed under the fifth predefined rule as compared with using the N2 directly without processing it. Preferably if a preferred implementation of the fifth predefined rule is "$+O_n$", then $SN2=(N2+O_n)\oplus PSK$; and moreover the fifth predefined rule can alternatively be head and tail inversion, cyclic shifting, addition of predetermined bits at preset positions, addition to a predefined constant, etc., but as compared with these rules, "$+O_n$" can prevent more effectively a potential security vulnerability from occurring to thereby improve the security of the entity authentication solution according to the application. As illustrated in FIG. 3, the method further includes the operation 4 and the operation 5:

In the operation 4, the entity A performs an XOR operation on the SN2 in the received authentication response message, and the PSK, then processes them under the sixth predefined rule, further processes them under a seventh predefined rule, then performs a further XOR operation on a result of the processing, and the PSK processed under the seventh predefined rule and further processed under an eighth predefined rule to obtain SON2, and sends the SON2 to the entity B in an authentication response acknowledgement message, where the entity authentication solution according to the application will become more secured using the result of the XOR operation processed under the sixth predefined rule and the seventh predefined rule as compared with using directly the result of the XOR operation without processing it; and the entity authentication solution according to the application will become more secure using the PSK processed under the seventh and eighth predefined rules as compared with using directly the PSK without processing it.

In a preferred embodiment, upon reception of the authentication response message, the entity A obtains the SN2 in the authentication response message, calculates $N2_A = SN2 \oplus PSK - O_n$, and then calculates $SON2 = (PSK'' + O_n) \oplus N2_A'$.

Here "$-O_n$" represents a preferred implementation of the sixth predefined rule; and moreover the sixth predefined rule can alternatively be head and tail inversion (correspondingly the fifth predefined rule is head and tail inversion), cyclic shifting (correspondingly if the fifth predefined rule is forward cyclic shifting, then the sixth predefined rule will be backward cyclic shifting; and on the contrary, if the fifth predefined rule is backward cyclic shifting, then the sixth predefined rule will be forward cyclic shifting), addition of predetermined bits at preset positions (correspondingly the fifth predefined rule is removal of the predetermined bits at the preset positions), addition of a predefined constant (correspondingly the fifth predefined rule is subtraction to the predefined constant), etc., but as compared with these rules, "$-O_n$" can prevent more effectively a potential security vulnerability from occurring to thereby improve the security of the entity authentication solution according to the application. Here $N2_A$ represents a result of performing by the entity A the XOR operation on the SN2 in the authentication response message, and the PSK, and then processing them under the sixth predefined rule, $N2_A'$ represents the $N2_A$ processed under the seventh predefined rule, and PKS'' represents the PSK processed under the seventh predefined rule, where a preferred implementation of the seventh predefined rule is bit-wise leftward cyclic shifting by m bits (the value of m is the number of bits which are "1" in the $N2_A$, and in another implementation, m can alternatively represent the number of bits which are "0" in the $N2_A$). Moreover the seventh predefined rule can alternatively be rightward cyclic shifting, head and tail inversion, etc. "$+O_n$" represents a preferred implementation of the eighth predefined rule; and moreover the eighth predefined rule can alternatively be head and tail inversion, cyclic shifting, addition of predetermined bits at preset positions, addition to a predefined constant, etc., but as compared with these rules, "$+O_n$" can prevent more effectively a potential security vulnerability from occurring to thereby improve the security of the entity authentication solution according to the application. In general, as compared with the other implementations, the respective preferred embodiments in this paragraph can prevent more effectively a potential security vulnerability from occurring to thereby improve the security of the entity authentication solution according to the application.

In the operation 5, the entity B receives the authentication response acknowledgement message sent by the entity A, performs an XOR operation on the SON2 in the authentication response acknowledgement message, and the PSK processed under the seventh predefined rule and further processed under the eighth predefined rule, compares a result of the XOR operation with the N2 processed under the seventh predefined rule, and determines from a result of the comparison whether the entity A is legal, and if the result of the comparison shows consistency, then a result of the authentication is that the entity A is legal; otherwise, the result of the authentication is that the entity A is illegal.

Preferably in the operation 2, if the entity B has not received the authentication response acknowledgement message sent by the entity A in a preset period T2 of time after the authentication response message is sent, then entity B may resend the authentication response message to the entity A; and if the entity B has not received the authentication response acknowledgement message sent by the entity A after the authentication response message is resent for a preset number p of times, then the entity B may determine that the authentication has failed. Further preferably, the authentication response acknowledgement message here can include the result of authentication by the entity A on the entity B, i.e., the first authentication result message above, then T3 is equal to T2, and q is equal to p.

Preferably in the operation 5, the method further includes:

The entity B sends the result of the authentication on the entity A to the entity A in a second authentication result message; and if the entity B determines that the entity A is legal, then the authentication result message may include authentication success information; otherwise, the authentication result message may include authentication failure information.

Then in the operation 3, if the entity A has not received the second authentication result message sent by the entity B in a preset period T4 of time after the authentication response message acknowledgement is sent, then the entity A may resend the authentication response acknowledgement message to the entity B; and If the entity A has not received the first authentication response message sent by the entity B after the authentication response acknowledgement message is resent for a preset number h of times, then the entity A may determine that the authentication has failed.

The preset period T1 of time for the entity A, and the preset period T2 of time for the entity B, which are set separately by the entity A and the entity B, may or may not be the same. The ability to tolerate a packet loss in communication according to the application can be improved by introducing the message timeout retransmission mechanism above. If the result is returned, then T4 and T3, which are set by the entity A and the entity B, may or may not be the same. The preset periods of time above may not be limited to any particular relationship, but can be set separately to different values, or can be set to the same value; and alike the preset numbers of time above may not be limited to any particular relationship, but can be set separately to different values, or can be set to the same value.

Preferably in the operation 3, if the entity A authenticates that the entity B is legal, then the entity A may calculate a session key SK between the entity A and the entity B as $SK = N1 \oplus N2_A \oplus PSK$, where $N2_A$ represents a result of processing by the entity A under the sixth predefined rule on the XOR operation on the SN2 in the authentication response message, and the PSK (in a preferred implementation, $N2_A = SN2 \oplus PSK - O_n$, that is, if the entity A authenticates that the entity B is legal, then the entity A may perform the XOR operation on the SN2 and the PSK, and then process them under the sixth predefined rule to obtain the result which is equal to the data generated locally by the entity B; and if the entity B is illegal, then the entity A may ignore the authentication response message without calculating the key, where the session key is configured to protect a session message between the two entities, and the session key is optionally calculated because the entity A may calculate the session key SK only if a session message between the entity A and the entity B is required to be protected.

In the operation 5, if the entity B authenticates that the entity A is legal, then the method may further include: the entity B calculates a session key SK between the entity B and the entity A as SK=$N1_B \oplus N2 \oplus PSK$, where $N1_B$ represents a result of processing by the entity B under the second predefined rule on the XOR operation on the SN1 in the authentication request message, and the PSK (in a preferred implementation, $N1_B$=$SN1 \oplus PSK-O_n$), that is, if the entity B authenticates that the entity A is legal, then the entity B may perform the XOR operation on the SN1 and the PSK, and then process them under the second predefined rule to obtain the result which is equal to the data generated locally by the entity A. If the entity A is illegal, then the entity B may ignore the authentication response acknowledgement message without calculating the key. The session key is optionally calculated by the entity B after the entity A is authenticated to be legal, because the entity B may calculate the session key SK only if a session message between the entity B and the entity A is required to be protected.

The embodiments above of the application enable bidirectional authentication between the entities based upon the pre-shared key. Moreover the entity A and the entity B can further negotiate about the session key between both of them to thereby secure subsequent communication between the entities.

Based upon the same inventive idea, embodiments of the application further provide apparatuses and a system for authenticating an entity, and since the system addresses the problem under a principle similar to the methods above for authenticating an entity, reference can be made to the implementations of the methods for implementations of these apparatuses, so a repeated description thereof will be omitted here.

Figure 4:
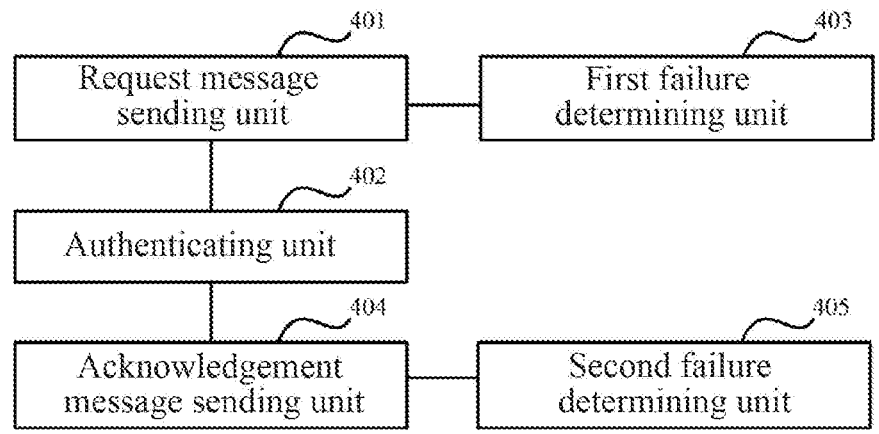
FIG. 4 is a structural diagram of an apparatus for authenticating an entity according to an embodiment of the application.

As illustrated in FIG. 4, an apparatus for authenticating an entity according to an embodiment of the application includes:

A request message sending unit 401 is configured to send an authentication request message to an entity B, where the authentication request message includes a result SN1 of an XOR operation on a result of processing under a first predefined rule on data N1 generated locally by the apparatus for authenticating an entity, and a PSK which is a key shared by the apparatus for authenticating an entity and the entity B; and An authenticating unit 402 is configured to receive an authentication response message sent by the entity B, to perform an XOR operation on SON1 in the authentication response message, and the PSK processed under a third predefined rule and further processed under a fourth predefined rule, to compare a result of the XOR operation with the N1 processed under the third predefined rule, and to determine from a result of the comparison whether the entity B is legal, where the SON1 represents a result of performing by the entity B an XOR operation on the SN1 in the received authentication request message and the PSK, then processing them under the second predefined rule, further processing them under the third predefined rule, and then performing a further XOR operation on a result of the processing under the third predefined rule, and the PSK processed under the third predefined rule and further processed under the fourth predefined rule.

Preferably the request sending unit 401 is configured to resend the authentication request message to the entity B if the authentication response message sent by the entity B has not been received in a preset period T1 of time after the authentication request message is sent; and the apparatus further includes a first failure determining unit 403 configured to determine that the authentication has failed, if the authentication response message sent by the entity B has not been received after the authentication request message is resent for a preset number g of times.

Preferably the apparatus further includes: an acknowledgment message sending unit 404 configured to perform an XOR operation on SN2 in the authentication response message, and the PSK, then process them under a sixth predefined rule, further process them under a seventh predefined rule, then perform a further XOR operation on a result of the processing, and the PSK processed under the seventh predefined rule and further processed under an eighth predefined rule to obtain SON2, and to send the SON2 to the entity B in an authentication response acknowledgement message, where the SN2 represents a result of an XOR operation on a result of processing under a fifth predefined rule on data N2 generated locally by the entity B, and the PSK.

Preferably the acknowledgment message sending unit 404 is configured to resend the authentication response acknowledgement message to the entity B if a second authentication result message sent by the entity B has not been received in a preset period T4 of time after the authentication response message acknowledgement is sent; and the apparatus further includes a second failure determining unit 405 configured to determine that the authentication has failed, if the second authentication response message sent by the entity B has not been received after the authentication response acknowledgement message is resent for a preset number h of times Preferably the authenticating unit 402 is configured to calculate a session key SK between the apparatus for authenticating an entity and the entity B as SK=$N1 \oplus N2_A \oplus PSK$ if the entity B is authenticated to be legal, where $N2_A$ represents a result of processing under the sixth predefined rule on the XOR operation on the SN2 in the authentication response message and the PSK (in a preferred implementation, $N2_A$=$SN2 \oplus PSK-O_n$).

Figure 5:
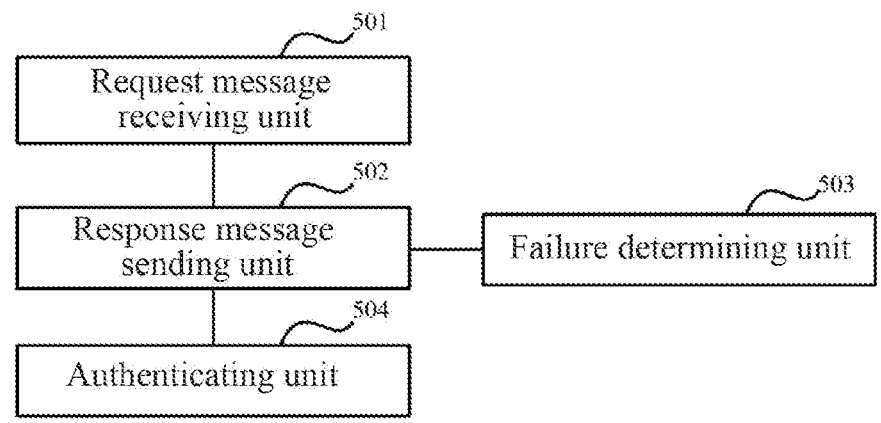
FIG. 5 is a structural diagram of an apparatus for authenticating an entity according to another embodiment of the application.

An embodiment of the application further provides another apparatus for authenticating an entity, as illustrated in FIG. 5, the apparatus including:

A request message receiving unit 501 is configured to receive an authentication request message sent by an entity A, where the authentication request message includes a result SN1 of an XOR operation on a result of processing under a first predefined rule on data N1 generated locally by the entity A, and a PSK which is a key shared by the entity A and the apparatus for authenticating an entity; and A response message sending unit 502 is configured to perform an XOR operation on the SN1 in the authentication request message, and the PSK, then process them under a second predefined rule, further process them under a third predefined rule, then perform a further XOR operation on a result of the processing under the third predefined rule, and the PSK processed under the third predefined rule and further processed under a fourth predefined rule to obtain SON1, and to send the SON1 to the entity A in an authentication response message.

Preferably the response message sending unit 502 is configured to resend the authentication response message to the entity A if a first authentication result message sent by the entity A has not been received in a preset period T3 of time after the authentication response message is sent; and the apparatus further includes a failure determining unit 503 configured to determine that the authentication has failed, if the first authentication result message sent by the entity A has not been received after the authentication response message is resent for a preset number q of times.

Preferably the response message sending unit 502 is further configured to perform a further XOR operation on a result of processing under a fifth predefined rule on data N2 generated locally by the apparatus for authenticating an entity, and the PSK to obtain SN2, and to send the authentication response message further including the SN2 to the entity A; and the apparatus further includes: an authenticating unit 504 is configured to receive an authentication response acknowledgement message sent by the entity A, to perform an XOR operation on SON2 in the authentication response message, and the PSK processed under a seventh predefined rule and further processed under an eighth predefined rule, to compare a result of the XOR operation with the N2 processed under the seventh predefined rule, and to determine from a result of the comparison whether the entity A is legal, where the SON2 represents a result of performing by the entity A an XOR operation on the SN2 in the received authentication response message and the PSK, then processing them under a sixth predefined rule, further processing them under the seventh predefined rule, and then performing a further XOR operation on a result of the processing, and the PSK processed under the seventh predefined rule and further processed under the eighth predefined rule.

Preferably the authenticating unit 504 is configured to calculate a session key SK between the apparatus for authenticating an entity and the entity A as $SK=N1_B \oplus N2 \oplus PSK$ if the entity A is authenticated to be legal, where $N1_B$ represents a result of processing under the second predefined rule on the XOR operation on the SN1 in the authentication request message and the PSK (in a preferred implementation, $N1_B=SN1 \oplus PSK-O_n$).

An embodiment of the application further provides a system for authenticating an entity, the system including an entity A and an entity B, where:

The entity A is configured to send an authentication request message to the entity B, where the authentication request message includes a result SN1 of an XOR operation on a result of processing under a first predefined rule on data N1 generated locally by the entity A, and a PSK which is a key shared by the entity A and the entity B;

The entity B is configured to receive the authentication request message sent by the entity A, to perform an XOR operation on the SN1 in the authentication request message, and the PSK, then process them under a second predefined rule, further process them under a third predefined rule, then perform a further XOR operation on a result of the processing under the third predefined rule, and the PSK processed under the third predefined rule and further processed under a fourth predefined rule to obtain SON1, and to send the SON1 to the entity A in an authentication response message; and The entity A is configured to receive the authentication response message sent by the entity B, to perform an XOR operation on the SON1 in the authentication response message, and the PSK processed under the third predefined rule and further processed under the fourth predefined rule, to compare a result of the XOR operation with the N1 processed under the third predefined rule, and to determine from a result of the comparison whether the entity B is legal.

Reference can be made to the description of the embodiments above for a particular implementation of authentication between the entity A and the entity B, so a repeated description thereof will be omitted here.

In the embodiments of the application, the entity A can be a reader or an electronic tag in a Radio Frequency Identification (RFID) system, and if the entity A is a reader, then the entity B may be an electronic tag; and if the entity A is an electronic tag, then the entity B may be a reader. In the embodiments of the application, the entity A can alternatively be a coordinator or a normal node in a Magnetic Field Area Network (MFAN), and if the entity A is a coordinator, then the entity B may be a normal node; and if the entity A is a normal node, then the entity B may be a coordinator. The application can be applicable to a Sensor Network (SN) (for example, the entity A is a cluster head node, and the entity B is a normal node), a Wireless Personal Area Network (WPAN) (for example, the entity A is a coordinator, and the entity B is a device), etc., in addition to the RFID and MFAN fields.

In summary, the application can authenticate an entity at a low overhead and with high security based upon an XOR operation, and also can be very widely applied.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the application have been described, those skilled in the art benefiting from the underlying inventive concept can make additional modifications and variations to these embodiments. Therefore the appended claims are intended to be construed as encompassing the preferred embodiments and all the modifications and variations coming into the scope of the application.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for authenticating an entity, the method comprising:
an operation 1, sending, by an entity A, an authentication request message to an entity B, wherein the authentication request message comprises a first result (SN1) of an XOR operation on a result of processing under a first predefined rule on data N1 generated locally by the entity A, and a pre-shared key (PSK) which is a key shared by the entity A and the entity B, wherein if the first predefined rule is "$+O_n$", then SN1=(N1+$O_n$)⊕PSK;
an operation 2, receiving, by the entity B, the authentication request message sent by the entity A, performing an XOR operation on the SN1 in the authentication request message, and the PSK, then processing them under a second predefined rule, further processing them under a third predefined rule, then performing a further XOR operation on a result of the processing under the third predefined rule, and the PSK processed under the third predefined rule and further processed under a fourth predefined rule to obtain a second result (SON1), and sending the SON1 to the entity A in an authentication response message, wherein the second predefined rule is a reversed rule of the first predefined rule, wherein if the second predefined rule is "$-O_n$", then $N1_B$=SN1⊕PSK-$O_n$, wherein $N1_B$ represents a result of performing by the entity the XOR operation on the SN1 in the authentication request message, and the PSK, and then processing them under the second predefined rule, wherein the third predefined rule is bit-wise leftward cyclic shifting by n bits, wherein the value of n is the number of bits which are "1" in the $N1_B$; and
an operation 3, receiving, by the entity A, the authentication response message sent by the entity B, performing an XOR operation on the SON1 in the authentication response message, and the PSK processed under the third predefined rule and further processed under the fourth predefined rule, comparing a result of the XOR operation with the N1 processed under the third predefined rule, and determining from a result of the comparison whether the entity B is legal,
wherein $O_n$ represents a constant, and the symbol "⊕" represents a bit-wise XOR operation.

2. The method according to claim 1,
if the fourth predefined rule is "$+O_n$", then SON1=(PSK'+$O_n$)⊕$N1_B$', wherein $N1_B$' represents the $N1_B$ processed under the third predefined rule, and PSK' represents the PSK processed under the third predefined rule.

3. The method according to claim 2, wherein $O_n$ is 5555 5555 5555 $5555_h$.

4. The method according to claim 1, wherein in the operation 2, when the entity B receives the authentication request message sent by the entity A, the method further comprises:
performing, by the entity B, a further XOR operation on a result of processing under a fifth predefined rule on data N2 generated locally by the entity B, and the PSK to obtain a first result (SN2), and the authentication response message sent by the entity B to the entity A further comprises the SN2; and
after the operation 3, if the entity A determines that the entity B is legal, then the method further comprises:
an operation 4, performing, by the entity A, an XOR operation on the SN2 in the authentication response message, and the PSK, then processing them under a sixth predefined rule, further processing them under a seventh predefined rule, then performing a further XOR operation on a result of the processing, and the PSK processed under the seventh predefined rule and further processed under an eighth predefined rule to obtain a fourth result (SON2), and sending the SON2 to the entity B in an authentication response acknowledgement message, wherein the sixth predefined rule is a reversed rule of the fifth predefined rule; and
an operation 5, receiving, by the entity B, the authentication response acknowledgement message sent by the entity A, performing an XOR operation on the SON2 in the authentication response acknowledgement message, and the PSK processed under the seventh predefined rule and further processed under the eighth predefined rule, comparing a result of the XOR operation with a result of the N2 processed under the seventh predefined rule, and determining from a result of the comparison whether the entity A is legal.

5. The method according to claim 4, wherein if the fifth predefined rule is "$+O_n$", then SN2=(N2+$O_n$)⊕PSK; if the sixth predefined rule is "$-O_n$", then $N2_A$=SN2⊕PSK-$O_n$, wherein $N2_A$ represents a result of performing by the entity A the XOR operation on the SN2 in the authentication response message, and the PSK, and then processing them under the sixth predefined rule; the seventh predefined rule is bit-wise leftward cyclic shifting by m bits, wherein the value of m is the number of bits which are "1" in the $N2_A$; and if the eighth predefined rule is "$+O_n$", then SON2=(PSK"+$O_n$)⊕$N2_A$', wherein $N2_A$' represents the $N2_A$ processed under the seventh predefined rule, and PSK" represents the PSK processed under the seventh predefined rule; and wherein $O_n$ represents a constant, and the symbol "⊕" represents a bit-wise XOR operation.

6. The method according to claim 5, wherein $O_n$ is 5555 5555 5555 $5555_h$.

7. The method according to claim 4, wherein in the operation 3, if the entity A authenticates that the entity B is legal, then the method further comprises:
calculating, by the entity A, a session key (SK) between the entity A and the entity B as SK=N1⊕$N2_A$⊕PSK, wherein $N2_A$ represents a result of processing by the entity A under the sixth predefined rule on the XOR operation on the SN2 in the authentication response message and the PSK; and
in the operation 5, if the entity B authenticates that the entity A is legal, then the method further comprises:
calculating, by the entity B, a session key (SK) between the entity B and the entity A as SK=$N1_B$⊕N2⊕PSK, wherein $N1_B$ represents a result of processing by the entity B under the second predefined rule on the XOR operation on the SN1 in the authentication request message and the PSK.

8. The method according to claim 7, wherein $N2_A$=SN2⊕PSK−$O_n$, and $N1_B$=SN1⊕PSK−$O_n$; and wherein $O_n$ represents a constant, and the symbol "⊕" represents a bit-wise XOR operation.

9. The method according to claim 8, wherein $O_n$ is 5555 5555 5555 $5555_h$.

10. An apparatus for authenticating an entity, the apparatus comprising:
a request message sending unit configured to send an authentication request message to an entity B, wherein the authentication request message comprises a first result (SN1) of an XOR operation on a result of processing under a first predefined rule on data N1 generated locally by the apparatus for authenticating an entity, and a pre-shared key (PSK) which is a key shared by the apparatus for authenticating an entity and the entity B, wherein if the first predefined rule is "+$O_n$", then SN1=(N1+$O_n$)⊕PSK; and
an authenticating unit configured to receive an authentication response message sent by the entity B, to perform an XOR operation on a second result (SON1) in the authentication response message, and the PSK processed under a third predefined rule and further processed under a fourth predefined rule, to compare a result of the XOR operation with the N1 processed under the third predefined rule, and to determine from a result of the comparison whether the entity B is legal, wherein the SON1 represents a result of performing by the entity B an XOR operation on the SN1 in the received authentication request message and the PSK, then processing them under the second predefined rule, further processing them under the third predefined rule, and then performing a further XOR operation on a result of the processing under the third predefined rule, and the PSK processed under the third predefined rule and further processed under the fourth predefined rule, wherein the second predefined rule is a reversed rule of the first predefined rule, wherein if the second predefined rule is "−$O_n$", then $N1_B$=SN1⊕PSK−$O_n$, wherein $N1_B$ represents a result of performing by the entity B the XOR operation on the SN1 in the authentication request message, and the PSK, and then processing them under the second predefined rule,
wherein the third predefined rule is bit-wise leftward cyclic shifting by n bits, wherein the value of n is the number of bits which are "1" in the $N1_B$,
wherein $O_n$ represents a constant, and the symbol "⊕" represents a bit-wise XOR operation.

11. The apparatus according to claim 10, further comprising:
an acknowledgment message sending unit configured to perform an XOR operation on a third result (SN2) in the authentication response message, and the PSK, then process them under a sixth predefined rule, further process them under a seventh predefined rule, then perform a further XOR operation on a result of the processing, and the PSK processed under the seventh predefined rule and further processed under an eighth predefined rule to obtain a fourth result (SON2), and to send the SON2 to the entity B in an authentication response acknowledgement message, wherein the SN2 represents a result of an XOR operation on a result of processing under a fifth predefined rule on data N2 generated locally by the entity B, and the PSK.

12. The apparatus according to claim 11, wherein the authenticating unit is further configured to calculate a session key (SK) between the apparatus and the entity B as SK=N1⊕$N2_A$⊕PSK if the entity B is authenticated to be legal, wherein $N2_A$ represents a result of processing under the sixth predefined rule on the XOR operation on the SN2 in the authentication response message and the PSK.

13. An apparatus for authenticating an entity, the apparatus comprising:
a request message receiving unit configured to receive an authentication request message sent by an entity A, wherein the authentication request message comprises a first result (SN1) of an XOR operation on a result of processing under a first predefined rule on data N1 generated locally by the entity A, and a pre-shared key (PSK) which is a key shared by the entity A and the apparatus for authenticating an entity, wherein if the first predefined rule is "+$O_n$", then SN1=(N1+$O_n$)⊕PSK; and
a response message sending unit configured to perform an XOR operation on the SN1 in the authentication request message, and the PSK, then process them under a second predefined rule, further process them under a third predefined rule, then perform a further XOR operation on a result of the processing under the third predefined rule, and the PSK processed under the third predefined rule and further processed under a fourth predefined rule to obtain a second result (SON1), and to send the SON1 to the entity A in an authentication response message, wherein the second predefined rule is a reversed rule of the first predefined rule, wherein if the second predefined rule is "−$O_n$", then $N1_B$=SN1⊕PSK−$O_n$, wherein $N1_B$ represents a result of performing by the entity B the XOR operation on the SN1 in the authentication request message, and the PSK, and then processing them under the second predefined rule,
wherein the third predefined rule is bit-wise leftward cyclic shifting by n bits, wherein the value of n is the number of bits which are "1" in the $N1_B$,
wherein $O_n$ represents a constant, and the symbol "⊕" represents a bit-wise XOR operation.

14. The apparatus according to claim 13, wherein the response message sending unit is further configured to perform a further XOR operation on a result of processing under a fifth predefined rule on data N2 generated locally by the apparatus for authenticating an entity, and the PSK to obtain a third result (SN2), and to send the authentication response message further comprising the SN2 to the entity A; and the apparatus further comprises:
an authenticating unit configured to receive an authentication response acknowledgement message sent by the entity A, to perform an XOR operation on a fourth result (SON2) in the authentication response message, and the PSK processed under a seventh predefined rule and further processed under an eighth predefined rule, to compare a result of the XOR operation with a result of the N2 processed under the seventh predefined rule, and to determine from a result of the comparison whether the entity A is legal, wherein the SON2 represents a result of performing by the entity A an XOR operation on the SN2 in the received authentication response message and the PSK, then processing them under a sixth predefined rule, further processing them under the seventh predefined rule, and then performing a further XOR operation on a result of the processing, and the PSK processed under the seventh predefined rule and further processed under the eighth predefined rule, wherein the sixth predefined rule is a reversed rule of the fifth predefined rule.

15. The apparatus according to claim 14, wherein the authenticating unit is configured to calculate a session key (SK) between the apparatus for authenticating an entity and the entity A as SK=$N1_B \oplus N2 \oplus PSK$ if the entity A is authenticated to be legal, wherein $N1_B$ represents a result of processing under the second predefined rule on the XOR operation on the SN1 in the authentication request message and the PSK.

* * * * *